(12) United States Patent
Suzuki (10) Patent No.: US 10,727,672 B2
(45) Date of Patent: Jul. 28, 2020

(54) POWER CONTROL APPARATUS, CONTROL METHOD OF POWER CONTROL APPARATUS, DISTRIBUTED POWER SUPPLY SYSTEM, AND CONTROL METHOD OF DISTRIBUTED POWER SUPPLY SYSTEM

(71) Applicant: KYOCERA Corporation, Kyoto-shi, Kyoto (JP)

(72) Inventor: Yuki Suzuki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 91 days.

(21) Appl. No.: 16/096,288

(22) PCT Filed: Apr. 26, 2017

(86) PCT No.: PCT/JP2017/016630
§ 371 (c)(1),
(2) Date: Oct. 25, 2018

(87) PCT Pub. No.: WO2017/188348
PCT Pub. Date: Nov. 2, 2017

(65) Prior Publication Data
US 2019/0140452 A1 May 9, 2019

(30) Foreign Application Priority Data
Apr. 26, 2016 (JP) ................. 2016-088630

(51) Int. Cl.
*H02J 3/32* (2006.01)
*H02J 3/38* (2006.01)
*H02M 7/48* (2007.01)
*H02J 9/06* (2006.01)

(52) U.S. Cl.
CPC ............ *H02J 3/32* (2013.01); *H02J 3/38* (2013.01); *H02J 9/06* (2013.01); *H02M 7/48* (2013.01); *Y02B 10/72* (2013.01); *Y02E 70/30* (2013.01)

(58) Field of Classification Search
CPC ...... H02J 3/32; H02J 3/38; H02J 9/06; H02M 7/48; Y02B 10/72; Y02E 70/30
USPC .......................................................... 307/46
See application file for complete search history.

(56) References Cited

U.S. PATENT DOCUMENTS
2016/0111916 A1  4/2016  Prakash et al.

FOREIGN PATENT DOCUMENTS
JP  2008-131808 A  6/2008
JP  2013-31308 A   2/2013

Primary Examiner — Hal Kaplan
(74) Attorney, Agent, or Firm — Hauptman Ham, LLP

(57) ABSTRACT

Inrush current to a load at the time of a power outage is reduced. A power control apparatus includes an inverter and a controller. When the controller detects a power outage in a power grid, the controller performs control so that output voltage supplied from the inverter to a switching device rises to an operating voltage. The operating voltage is the voltage at which the switching device operates to switch from electric power supplied to load devices from the power grid to electric power from the inverter. The controller also performs control to maintain the output voltage at or below the operating voltage when the output voltage reaches the operating voltage and then performs control so that the output voltage rises to a predetermined voltage exceeding the operating voltage.

9 Claims, 8 Drawing Sheets

POWER CONTROL APPARATUS, CONTROL METHOD OF POWER CONTROL APPARATUS, DISTRIBUTED POWER SUPPLY SYSTEM, AND CONTROL METHOD OF DISTRIBUTED POWER SUPPLY SYSTEM

CROSS-REFERENCE TO RELATED APPLICATION

The present application is a national phase of International Application Number PCT/JP2017/016630, filed Apr. 26, 2017, which claims priority to and the benefit of Japanese Patent Application No. 2016-088630 filed Apr. 26, 2016, the entire contents of which are incorporated herein by reference.

TECHNICAL FIELD

The present disclosure relates to a power control apparatus, a control method of a power control apparatus, a distributed power supply system, and a control method of a distributed power supply system.

BACKGROUND

In recent years, systems including distributed power supplies, such as solar cells, storage cells, and fuel cells, have increasingly been installed in consumer facilities. Such a system performs interconnected operation, to interconnect to a commercial power grid (power grid) and output electric power from the distributed power supplies, and independent operation, to output electric power from the distributed power supplies independently from the power grid.

If inrush current occurs in the system, electronic components and the like in the system may suffer damage. To address this, patent literature (PTL) 1 proposes a system that reduces inrush current flowing into the system from the power grid.

CITATION LIST

Patent Literature

PTL 1: JP201331308A

SUMMARY

A power control apparatus according to an embodiment of the present disclosure includes an inverter and a controller. The inverter converts electric power of a distributed power supply and supplies the converted electric power to a switching device. The controller controls the inverter. The controller controls output voltage of the inverter so that voltage supplied from the inverter to the switching device rises to a first voltage when the controller detects a power outage in a power grid. The first voltage is the voltage at which the switching device operates to switch from a first electric power to a second electric power from the inverter. The controller also maintains the output voltage at or below the first voltage when the output voltage reaches the first voltage and then controls the output voltage to rise to a predetermined voltage exceeding the first voltage.

A power control apparatus according to an embodiment of the present disclosure includes an inverter and a controller. The inverter converts electric power of a distributed power supply and supplies the converted electric power to a switching device. The controller controls the inverter. The controller performs control so that a first phase voltage of the inverter rises to a predetermined voltage when the controller detects a power outage in a power grid. The first phase voltage is supplied to the switching device, which switches from a first electric power to a second electric power from the inverter. The first electric power is electric power supplied to load devices (load) from the power grid. The controller also performs control so that a second phase voltage of the inverter rises to a predetermined voltage after a predetermined time elapses from detection of the power outage in the power grid.

A control method of a power control apparatus according to an embodiment of the present disclosure is a control method of a power control apparatus for controlling electric power of a distributed power supply. The power control apparatus includes an inverter that converts electric power of a distributed power supply and supplies the converted electric power to a switching device. The control method of a power control apparatus includes detecting a power outage in a power grid. The control method of a power control apparatus also includes raising an output voltage of the inverter to a first voltage when detecting the power outage in the power grid. The switching device operates at the first voltage to switch from a first electric power to a second electric power from the inverter. The first electric power is electric power supplied to a load from the power grid. The control method of a power control apparatus also includes maintaining the output voltage of the inverter at or below the first voltage when the output voltage of the inverter reaches the first voltage and then raising the output voltage of the inverter to a predetermined voltage exceeding the first voltage.

A control method of a power control apparatus according to an embodiment of the present disclosure is a control method of a power control apparatus for controlling electric power of a distributed power supply. The power control apparatus includes an inverter that converts electric power of the distributed power supply. The control method of a power control apparatus includes detecting a power outage in a power grid. The control method of a power control apparatus also includes raising a first phase voltage from the inverter to a predetermined voltage when detecting the power outage in the power grid. The first phase voltage is supplied to a switching device that switches from a first electric power to a second electric power from the inverter. The first electric power is electric power supplied to a load from the power grid. The control method of a power control apparatus also includes raising a second phase voltage supplied from the inverter to the switching device to a predetermined voltage after a predetermined time elapses from detection of the power outage in the power grid.

A distributed power supply system according to an embodiment of the present disclosure includes a distributed power supply, a switching device, and a power control apparatus. The power control apparatus includes an inverter that converts electric power of the distributed power supply and a controller that controls the inverter. The controller controls output voltage of the inverter so that voltage supplied from the inverter to the switching device rises to a first voltage when the controller detects a power outage in a power grid. The first voltage is the voltage at which the switching device operates to switch from a first electric power provided to a load from the power grid to a second electric power from the inverter. The controller also maintains the output voltage at or below the first voltage when the output voltage reaches the first voltage and then controls the output voltage to rise to a predetermined voltage exceeding the first voltage.

A distributed power supply system according to an embodiment of the present disclosure includes a distributed power supply, a switching device, and a power control apparatus. The power control apparatus includes an inverter that converts electric power of the distributed power supply and a controller that controls the inverter. The controller performs control so that a first phase voltage of the inverter rises to a predetermined voltage when the controller detects a power outage in a power grid. The first phase voltage is supplied to the switching device, which switches from a first electric power supplied to a load from the power grid to a second electric power from the inverter. The controller also performs control so that a second phase voltage of the inverter rises to a predetermined voltage after a predetermined time elapses from detection of the power outage in the power grid.

A control method of a distributed power supply system according to an embodiment of the present disclosure is a control method of a distributed power supply system including a distributed power supply, a switching device, and a power control apparatus. The power control apparatus includes an inverter that converts electric power of the distributed power supply. The control method of a distributed power supply system includes detecting, using the power control apparatus, a power outage in a power grid. The control method of a distributed power supply system also includes raising, using the power control apparatus, an output voltage of the inverter to a first voltage when detecting the power outage in the power grid. The switching device operates at the first voltage to switch from a first electric power supplied to a load from the power grid to a second electric power from the inverter. The control method of a distributed power supply system also includes maintaining, using the power control apparatus, the output voltage of the inverter at or below the first voltage when the output voltage of the inverter reaches the first voltage and then raising the output voltage of the inverter to a predetermined voltage exceeding the first voltage.

A control method of a distributed power supply system according to an embodiment of the present disclosure is a control method of a distributed power supply system including a distributed power supply, a switching device, and a power control apparatus. The power control apparatus includes an inverter that converts electric power of the distributed power supply. The control method of a distributed power supply system includes detecting, using the power control apparatus, a power outage in a power grid. The control method of a distributed power supply system also includes raising, using the power control apparatus, a first phase voltage from the inverter to a predetermined voltage when detecting the power outage in the power grid. The first phase voltage is supplied to a switching device, which switches from a first electric power supplied to a load from the power grid to a second electric power from the inverter. The control method of a distributed power supply system also includes raising a second phase voltage supplied from the inverter to the switching device to a predetermined voltage after a predetermined time elapses from detection of the power outage in the power grid.

DETAILED DESCRIPTION

A known system performs independent operation when a power outage occurs in the power grid and supplies electric power to a load of a consumer facility from the distributed power supplies. At this time, a known system switches the path for supplying electric power using a switching device.

To reduce the inrush current occurring when switching the electric power supply to the distributed power supplies, a known system gradually increases the output voltage of the distributed power supplies from a value near 0 V. The switching device, however, operates on electric power supplied from the distributed power supplies when a power outage occurs in the power grid. Therefore, the switching device switches the path inside the switching device when the voltage supplied to the switching device from the distributed power supplies reaches a value near the operating voltage of the switching device. Furthermore, the power supply from the distributed power supplies to the load starts when the path inside the switching device switches. The power supply to the load thus starts at a somewhat high voltage in a known system. Even after the power supply to the load starts, the voltage supplied to the load in a known system continues to be raised until reaching a predetermined voltage (such as the voltage of the power grid). A large inrush current therefore sometimes accompanies the power supply to the load in a known system.

In light of the aforementioned problem, the present disclosure aims to provide a power control apparatus, a control method of a power control apparatus, a distributed power supply system, and a control method of a distributed power supply system that can reduce inrush current.

The distributed power supplies are solar cells, fuel cells, and storage cells in the present disclosure but are not limited to these examples. The distributed power supplies may, for example, generate electricity using wind power, geothermal power, hydraulic power, or the like.

First Embodiment

[System Configuration]

Figure 1:
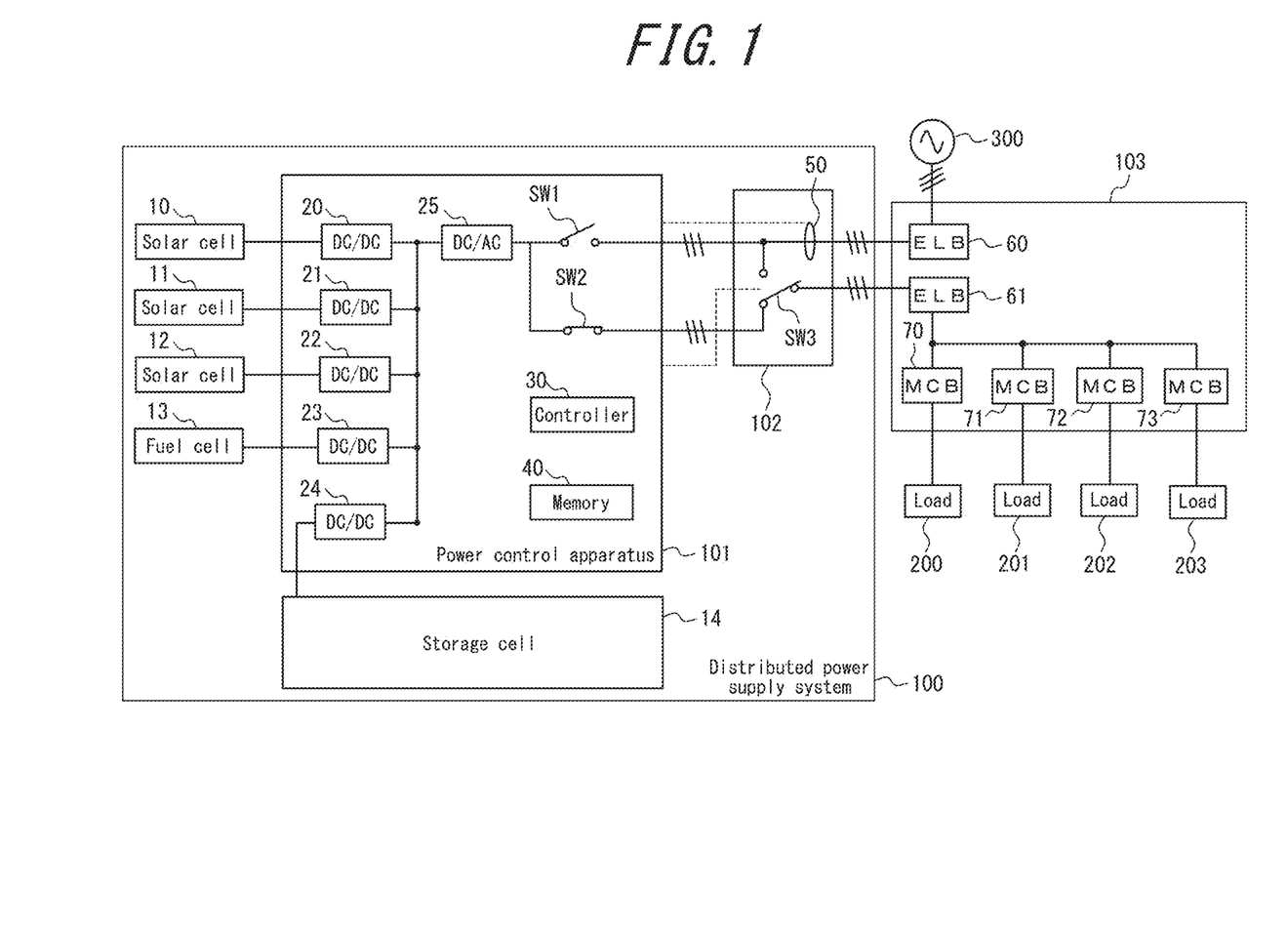
FIG. 1 illustrates an example of the schematic configuration of a distributed power supply system according to a first embodiment of the present disclosure.

FIG. 1 illustrates an example of the schematic configuration of a distributed power supply system 100 according to the first embodiment of the present disclosure. The solid lines connecting functional blocks indicate power lines, and the dashed lines indicate control lines and signal lines. The connections indicated by the control lines and signal lines may be wired connections or wireless connections. A distribution board 103, loads 200, 201, 202, and 203, and a power grid 300 all connected to the distributed power supply system 100 are also illustrated.

The distributed power supply system usually performs interconnected operation with the single-phase three-wire power grid 300. During interconnected operation, the distributed power supply system 100 supplies electric power from the power grid 300 and electric power from the distributed power supplies (solar cells 10 to 12, fuel cell 13, and storage cell 14) to the loads 200 to 203 through the distribution board 103. The distributed power supply system 100 performs independent operation during a power outage in the power grid 300. During independent operation, the distributed power supply system 100 supplies electric power from the distributed power supplies (solar cells 10 to 12, fuel cell 13, and storage cell 14) to the loads 200 to 203 through the distribution board 103.

The distributed power supply system 100 includes the solar cells 10, 11, 12, the fuel cell 13, the storage cell 14, a power control apparatus 101, and a switching device 102. The distributed power supply system 100 illustrated in FIG. 1 includes three solar cells, one fuel cell, and one storage cell, but the number of solar cells, fuel cells, and storage cells included in the distributed power supply system 100 is not limited to this example. The distributed power supply system 100 may include any number of solar cells, fuel cells, and storage cells.

The solar cells 10 to 12 convert energy from sunlight into electrical energy to generate direct current (DC) voltage. The solar cells 10 to 12 supply the generated DC voltage to the power control apparatus 101.

The fuel cell 13 generates DC voltage by a chemical reaction between hydrogen and oxygen in the air. The fuel cell 13 supplies the generated DC voltage to the power control apparatus 101.

The storage cell 14 supplies DC voltage to the power control apparatus 101 by discharging. The storage cell 14 charges with DC voltage supplied by the power control apparatus 101.

The power control apparatus 101 controls the electric power of the solar cells 10 to 12, the fuel cell 13, and the storage cell 14. For example, the power control apparatus 101 converts the DC voltage output from the solar cells 10 to 12, the fuel cell 13, and the storage cell 14 to a predetermined voltage. Furthermore, the power control apparatus 101 converts the DC voltage, after conversion to a predetermined voltage, into alternating current (AC) voltage. Subsequently, the power control apparatus 101 supplies the converted AC voltage to the switching device 102. The configuration of the power control apparatus 101 is described in detail below.

Electric power from the power grid 300 and electric power of the solar cell 10 and the like from the power control apparatus 101 are supplied to the switching device 102. The switching device 102 usually supplies the electric power from the power grid 300 and the electric power from the solar cell 10 and the like to the distribution board 103. When the power grid 300 suffers a power outage, the switching device 102 switches the path in the switching device 102 to supply electric power from the solar cell 10 and the like to the distribution board 103. When the power grid 300 suffers a power outage, the switching device 102 operates on the electric power supplied from the solar cell 10 and the like. The configuration of the switching device 102 is described in detail below.

The distribution board 103 supplies electric power from the power grid 300 to the switching device 102. The distribution board 103 also distributes electric power supplied from the switching device 102 to the loads 200 to 203. The configuration of the distribution board 103 is described in detail below.

The loads 200 to 203 are installed in a consumer facility. The loads 200 to 203 consume electric power supplied from the distribution board 103. The loads 200 to 203 are, for example, electric appliances such as a refrigerator or a dryer.

The configuration of the power control apparatus 101 is now described in detail.

The power control apparatus 101 includes DC/DC converters 20, 21, 22, 23, and 24, an inverter 25, switches SW1 and SW2, a controller 30, and a memory 40. The power control apparatus 101 constitutes a multi-DC link system.

The DC/DC converters 20 to 24 each perform DC/DC conversion in accordance with control by the controller 30. The DC/DC converters 20 to 24 convert the DC voltage supplied from the respective solar cells 10 to 12, fuel cell 13, and storage cell 14 to a predetermined voltage and output the converted DC voltage to the inverter 25.

The DC/DC converters 23 and 24 can perform bidirectional DC/DC conversion. The DC/DC converter 23 converts the DC voltage supplied from the DC/DC converters 20 to 22 and 24 and the inverter 25 to a predetermined voltage and outputs the result to the fuel cell 13. When the fuel cell 13 is activated, the fuel cell 13 uses the electric power supplied by this process as startup power for activating a heater and auxiliary equipment (various pumps and the like). The DC/DC converter 24 converts the DC voltage supplied from the DC/DC converters 20 to 23 and the inverter 25 to a predetermined voltage and outputs the result to the storage cell 14. The storage cell 14 is charged with electric power supplied by this process.

In accordance with control by the controller 30, the inverter 25 converts the DC voltage supplied from the DC/DC converters 20 to 24 collectively to single-phase three-wire AC voltage. The inverter 25 outputs the converted AC voltage to the switches SW1 and SW2.

The switch SW1 is, for example, an interconnection switch. The switch SW2 is, for example, an independent switch. The switches SW1 and SW2 are each made of relays, transistors, and the like. The switches SW1 and SW2 each switch between on/off states in accordance with control by the controller 30. An example of the on/off states of the switches SW1 and SW2 in accordance with control by the controller 30 is briefly described below.

When the distributed power supply system 100 performs interconnected operation, the switch SW1 turns on and the switch SW2 turns off in accordance with control by the controller 30. This configuration supplies electric power from the solar cells 10 to 12, the fuel cell 13, and the storage cell 14 to the switching device 102 through the switch SW1.

When the distributed power supply system 100 performs independent operation, the switch SW1 turns off and the switch SW2 turns on in accordance with control by the controller 30. This configuration supplies electric power from the solar cells 10 to 12, the fuel cell 13, and the storage cell 14 to the switching device 102 through the switch SW2. Upon detecting a power outage in the power grid 300, the controller 30 turns the switches SW1 and SW2 to these on/off states to parallel off the solar cell 10 and the like from the power grid 300 and perform independent operation.

The controller 30 controls and manages the power control apparatus 101 overall. The controller 30 may, for example, be a processor. The controller 30 implements a variety of functions by reading and executing programs stored in the memory 40.

The controller 30 detects a power outage in the power grid 300, for example. Upon detecting a power outage in the power grid 300, the controller 30 performs soft start control by gradually (continuously) raising the voltage supplied from the inverter 25 to the switching device 102. Subsequently, when the voltage supplied to the switching device 102 reaches the operating voltage of the switching device 102, the controller 30 maintains the voltage at or below the operating voltage and then performs control so that the voltage rises to a predetermined voltage exceeding the operating voltage. These processes are described in detail below.

The memory 40 stores information necessary for processing by the power control apparatus 101 and programs with a description of processing to implement the functions of the power control apparatus 101. For example, the memory 40 stores the operating voltage of the switching device 102 (first voltage) and the below-described predetermined time t1. The operating voltage refers to the voltage at which the switching device operates to switch from electric power supplied to the loads 200 to 203 from the power grid 300 (first electric power) to electric power from the inverter 25 (second electric power).

Next, the configuration of the switching device 102 is described in detail.

The switching device 102 includes a switch SW3, corresponding to a single-phase three-wire system, and a current sensor 50. The current sensor 50 illustrated in FIG. 1 is located inside the switching device 102, but the current sensor 50 may be provided at a location other than the switching device 102 (for example, inside the distribution board 103).

The switch SW3 is made of relays, transistors, and the like. The switch SW3 usually (during interconnected operation) supplies the electric power from the power grid 300 and the electric power from the solar cell 10 and the like, supplied by the power control apparatus 101, to the distribution board 103 in accordance with control by the controller 30. When the power grid 300 suffers a power outage, the switch SW3 supplies the electric power from the solar cell 10 and the like, supplied by the power control apparatus 101, to the distribution board 103 in accordance with control by the controller 30.

The current sensor 50 is provided between the power grid 300 and the power control apparatus 101. The current sensor 50 detects the value of forward power flow from the power grid 300 or of reverse power flow to the power grid 300 and transmits the detected value to the power control apparatus 101.

Next, the configuration of the distribution board 103 is described in detail.

The distribution board 103 includes breakers 60 and 61 and breakers 70, 71, 72, and 73.

The breakers 60, 61 are, for example, leakage breakers such as earth leakage circuit breakers (ELBs). The breakers 60, 61 open the electrical circuit upon detecting leakage current from the power line to the ground.

The breakers 70 to 73 are, for example, safety breakers such as molded case circuit breakers (MCBs). The loads 200 to 203 are connected respectively to the breakers 70 to 73. The electric power from the solar cells 10 to 12, the fuel cell 13, the storage cell 14, and the power grid 300 is supplied respectively to the loads 200 to 203 through the breakers 70 to 73. The breakers 70 to 73 each open the electrical circuit when overcurrent flows due to a shorted cable or the like or due to malfunctioning of the loads 200 to 203.

Next, processing by the controller 30 is described in detail.

Upon detecting a power outage in the power grid 300, the controller 30 performs soft start control to gradually raise the voltage supplied from the inverter 25 to the switching device 102. Furthermore, when the output voltage of the inverter 25 reaches the operating voltage, the controller 30 maintains the output voltage at the operating voltage for the predetermined time t1. Subsequently, the controller 30 performs control so that the output voltage rises to a predetermined voltage of the power grid 300 exceeding the operating voltage.

Figure 2:
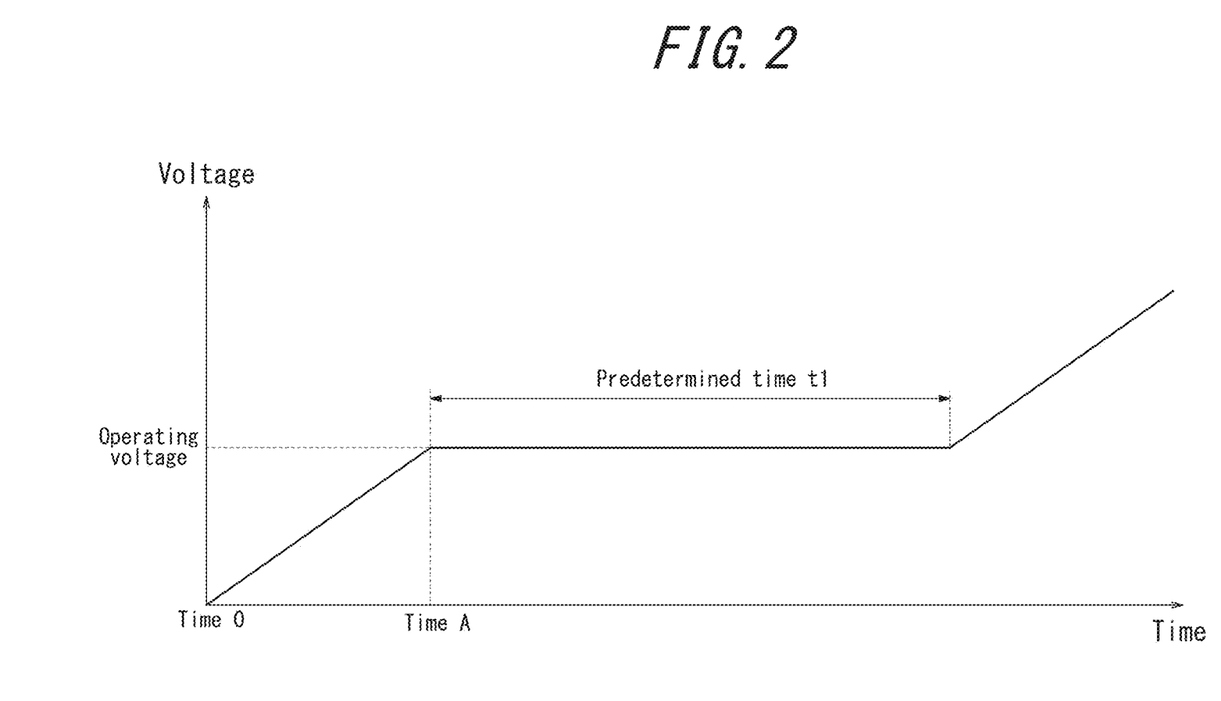
FIG. 2 illustrates the change in the effective value of the output voltage, during a power outage, in a power control apparatus according to the first embodiment of the present disclosure.

FIG. 2 illustrates the change in the effective value of the output voltage, during a power outage, in the power control apparatus 101 according to the first embodiment of the present disclosure. The vertical axis represents the effective value of the output voltage of the inverter 25 (the voltage supplied to the distribution board), and the horizontal axis represents time. In FIG. 2, time 0 is the time at which a power outage occurs in the power grid 300. At time 0, the power outage in the power grid 300 is detected by the controller 30, and the output voltage of the inverter 25 is controlled by the controller 30 to gradually increase. Subsequently, at time A when the output voltage of the inverter 25 reaches the operating voltage of the switching device 102, the path in the switching device 102 switches so that electric power is supplied from the solar cell 10 and the like to the loads 200 to 203 through the power control apparatus 101. In other words, power starts to be supplied to the loads 200 to 203 at time A. In the present embodiment, the output voltage of the inverter 25, i.e. the voltage supplied to the loads 200 to 203, is maintained at a somewhat low voltage (operating voltage) for the predetermined time t1 after the time A at which power starts to be supplied to the loads 200 to 203. Such control in the present embodiment allows the inrush current accompanying the power supply to the loads 200 to 203 to be reduced.

The predetermined time t1 can be set taking into account the number of loads 200 and the like to which electric power from the solar cell 10 is supplied when the power grid 300 suffers a power outage.

The case of not performing power control according to the present embodiment during a power outage is described below as a comparative example.

Comparative Example

Figure 3:
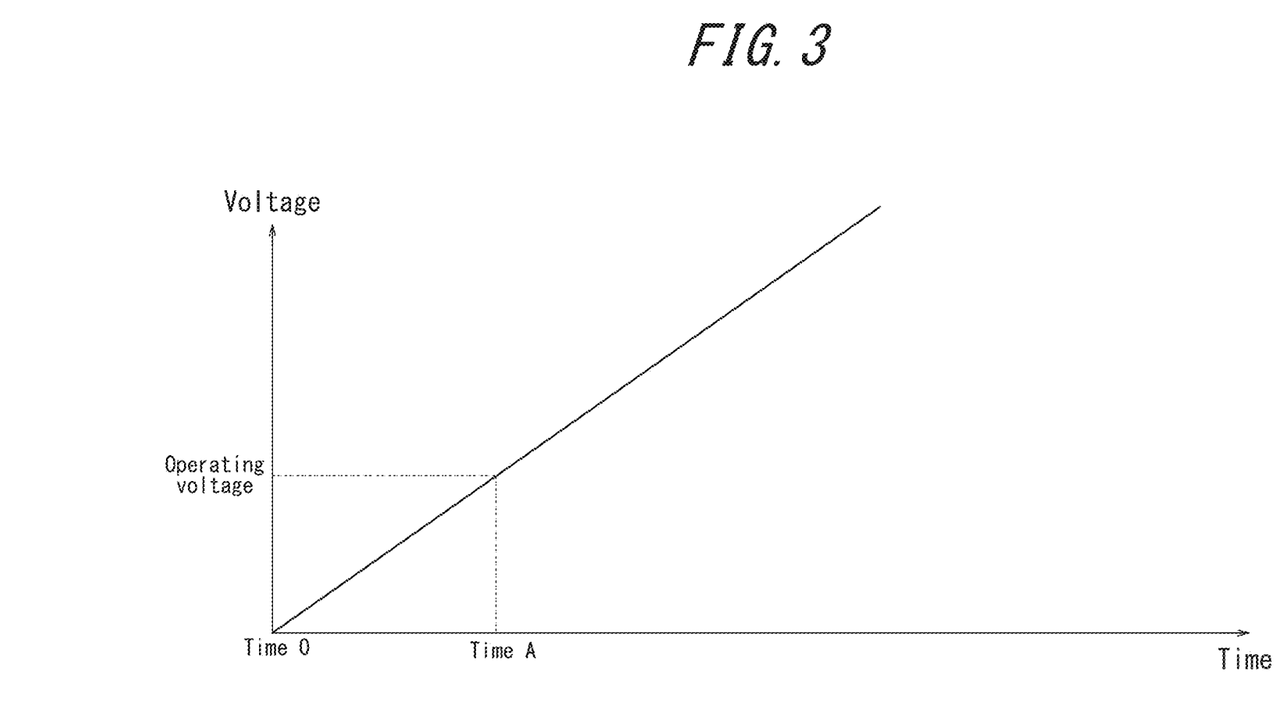
FIG. 3 illustrates the change in the effective value of the output voltage, during a power outage, in a power control apparatus according to a comparative example.

FIG. 3 illustrates the change in the effective value of the output voltage, during a power outage, in a power control apparatus according to a comparative example. The vertical axis represents the effective value of the output voltage of the inverter (the effective value of the voltage supplied to the switching device), and the horizontal axis represents time. In FIG. 3, time 0 is the time at which a power outage occurs in the power grid. In the comparative example, the output voltage of the inverter continues to be raised even after reaching the operating voltage of the distribution board. Consequently, the voltage supplied to the load continues to rise after the time A when power starts to be supplied to the load. From time A onward, the inrush current accompanying the power supply to the load thus ends up increasing.

By contrast, the voltage supplied to the loads 200 to 203 in the present embodiment is maintained at a somewhat low voltage (operating voltage) after the time A for the predetermined time t1. The present embodiment can therefore reduce the inrush current accompanying the power supply to the loads 200 to 203.

[System Operations]

Figure 4:
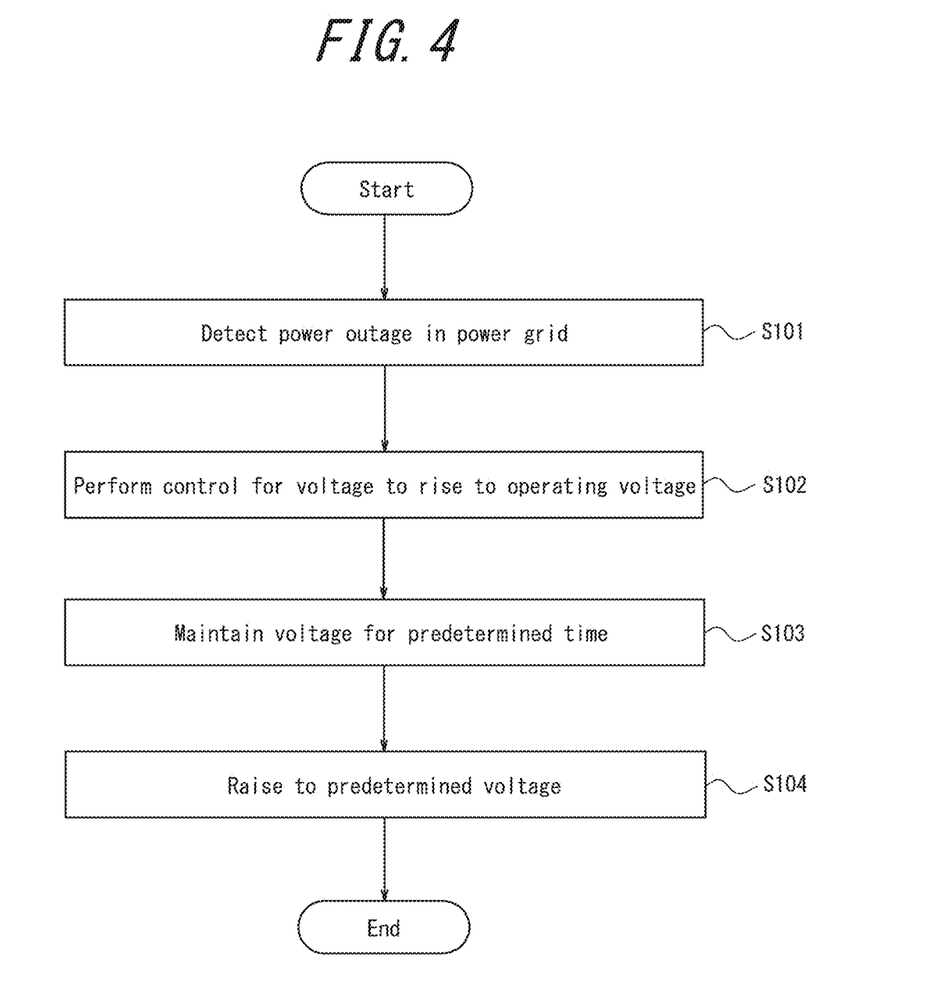
FIG. 4 is a flowchart illustrating an example of operations of the distributed power supply system according to the first embodiment of the present disclosure.

FIG. 4 is a flowchart illustrating an example of operations by the power control apparatus 101 according to the first embodiment of the present disclosure.

The controller 30 detects a power outage in the power grid 300 (step S101). The controller 30 then performs control so that the voltage supplied from the inverter 25 to the switching device 102 rises gradually to the operating voltage (step S102). Furthermore, when the output voltage of the inverter 25 reaches the operating voltage, the controller 30 maintains the output voltage near the operating voltage for the predetermined time t1 (step S103). Subsequently, the controller 30 performs control so that the output voltage rises to a predetermined voltage of the power grid 300 exceeding the operating voltage (step S104).

The switching of the switching device 102 to supply electric power from the solar cell 10 and the like to the loads 200 to 203 when the power grid 300 suffers a power outage is maintained during the power outage in the power grid 300. Consequently, when the output voltage of the inverter 25 is raised again due to overload of the loads 200 to 203 during the power outage in the power grid 300, voltage is initially supplied to the loads 200 to 203 from near 0 V. When the controller 30 raises the output voltage of the inverter 25 again due to overload of the loads 200 to 203 during the power outage in the power grid 300, the controller 30 can therefore simply perform soft start control.

In the present disclosure, the "first voltage" has been described as being the operating voltage of the switching device 102. However, the "first voltage" is not limited to the operating voltage and may, for example, be any voltage near the operating voltage of the switching device 102.

In this way, the power control apparatus 101 according to the first embodiment performs control so that the output voltage of the inverter 25 supplied to the switching device 102 rises gradually to the operating voltage when a power outage occurs in the power grid 300. Furthermore, when the output voltage reaches the operating voltage, the power control apparatus 101 performs control to maintain the output voltage at the operating voltage for the predetermined time t1. As a result of this control, a somewhat low voltage continues to be supplied to the loads 200 to 203 after the path in the switching device 102 switches and power starts to be supplied to the loads 200 to 203. The present embodiment can therefore reduce the inrush current accompanying the power supply to the loads 200 to 203.

Furthermore, the power control apparatus 101 according to the present embodiment can reduce the inrush current by performing the aforementioned control, without provision of a special circuit. The present embodiment can therefore prevent greater complexity of the circuit configuration in the power control apparatus 101 due to provision of a special circuit in the power control apparatus 101.

Second Embodiment

[System Configuration]

A power control apparatus 101 according to the second embodiment may have a configuration similar to that of the power control apparatus 101 according to the first embodiment. The differences from the first embodiment are therefore mainly described below with reference to FIG. 1.

During a power outage in the power grid 300, the controller 30 of the second embodiment lowers the output voltage of the inverter 25 to below the operating voltage when the output voltage reaches the operating voltage. Subsequently, the controller 30 performs control so that the output voltage rises gradually to a predetermined voltage of the power grid 300 exceeding the operating voltage.

Figure 5:
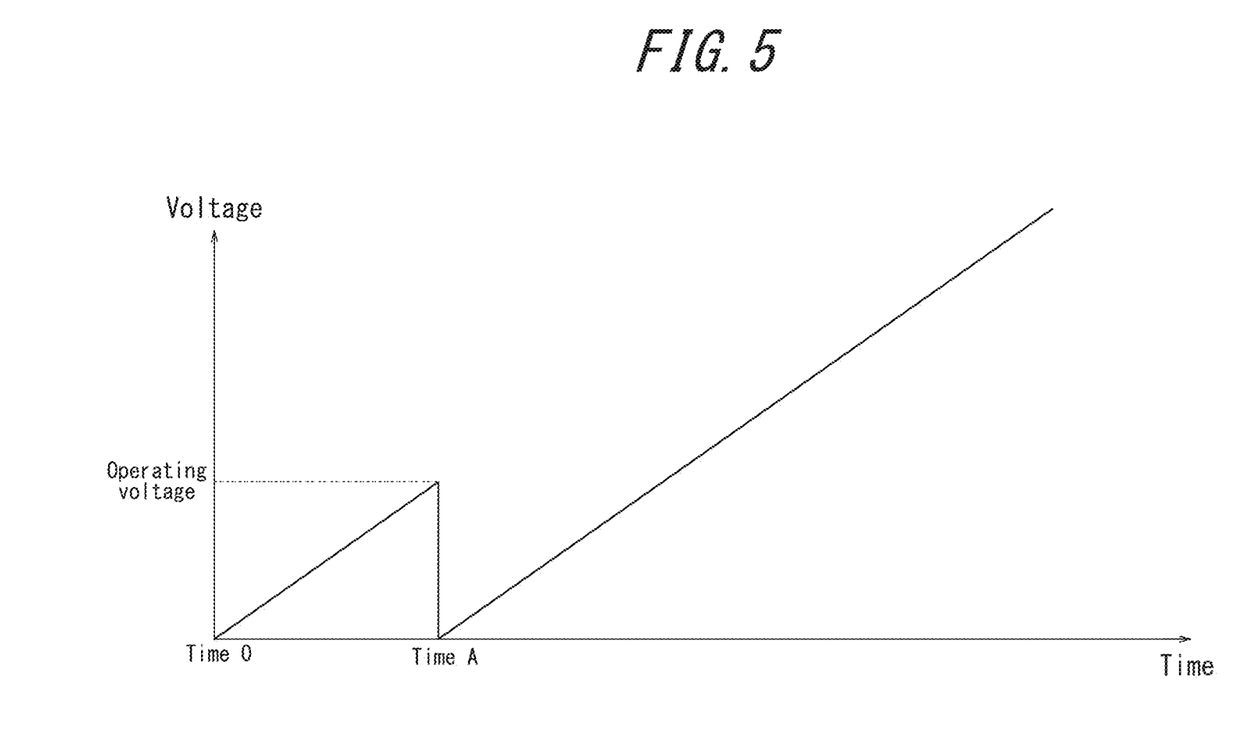
FIG. 5 illustrates the change in the effective value of the output voltage, during a power outage, in a power control apparatus according to a second embodiment of the present disclosure.

FIG. 5 illustrates the change in the effective value of the output voltage, during a power outage, in the power control apparatus 101 according to the second embodiment of the present disclosure. The vertical axis represents the effective value of the output voltage of the inverter 25 (the effective value of the voltage supplied to the switching device 102), and the horizontal axis represents time. In FIG. 5, time 0 is the time at which a power outage occurs in the power grid 300. At time 0, the power outage in the power grid 300 is detected by the controller 30, and the output voltage of the inverter 25 is controlled by the controller 30 to gradually increase. Subsequently, at time A when the output voltage of the inverter 25 reaches the operating voltage of the switching device 102, the path in the switching device 102 switches. In other words, at time A, electric power can be supplied from the solar cell 10 and the like to the loads 200 to 203. From time A onwards, the path in the switching device 102 is maintained so that electric power from the solar cell 10 and the like is supplied to the loads 200 to 203. The output voltage of the inverter 25, i.e. the voltage supplied to the loads 200 to 203, is also controlled at time A to lower to near 0 V. Subsequently, the output voltage is controlled to rise gradually.

In this way, the voltage supplied to the loads 200 to 203 after the path switches in the switching device 102 is controlled in the second embodiment to lower to near 0 V and then rise gradually. Consequently, power starts to be supplied to the loads 200 to 203 from near 0 V. The second embodiment can therefore reduce the inrush current accompanying the power supply to the loads 200 to 203.

[System Operations]

Figure 6:
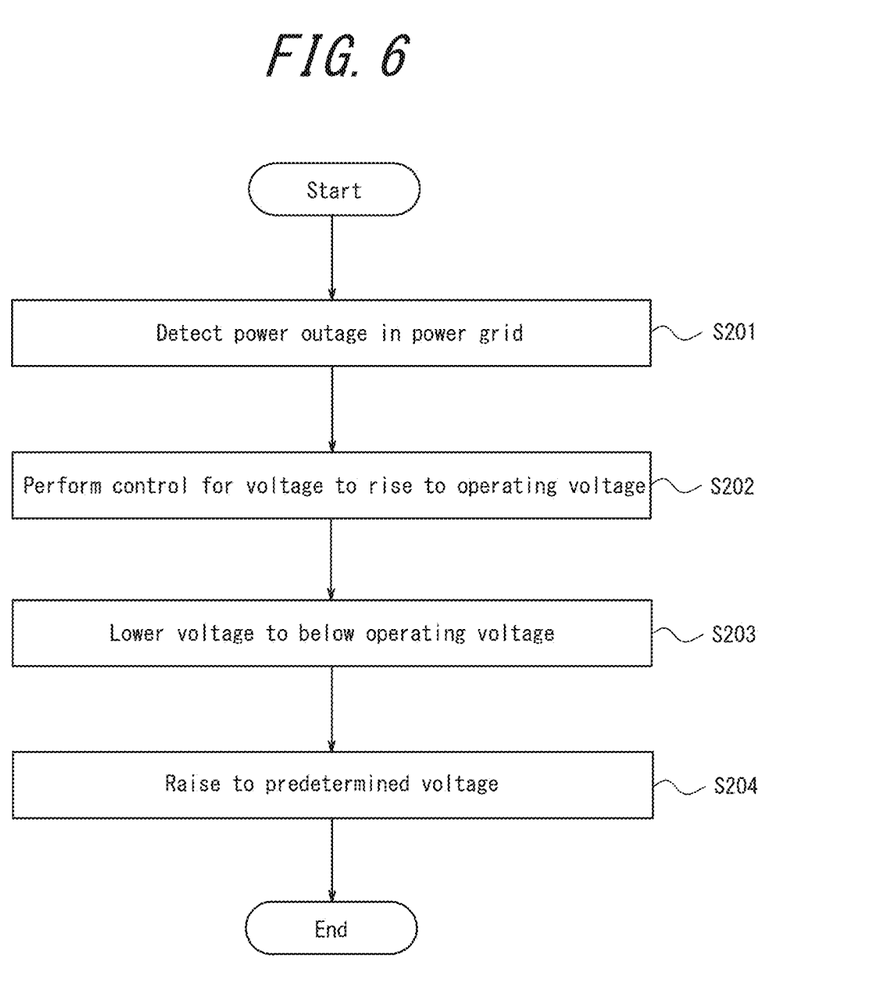
FIG. 6 is a flowchart illustrating an example of operations of a distributed power supply system according to the second embodiment of the present disclosure.

Operations of the power control apparatus 101 according to the second embodiment of the present disclosure are now described. FIG. 6 is a flowchart illustrating an example of operations by the distributed power supply system 1 according to the second embodiment of the present disclosure.

The processing in steps S201 and S202 of FIG. 6 is similar to the processing in steps S101 and S102 of FIG. 4. Hence, a description thereof is omitted.

The output voltage of the inverter 25 reaches the operating voltage. The controller 30 then lowers the output voltage to fall below the operating voltage (step S203). For example, the controller 30 lowers the output voltage of the inverter 25 to near 0 V. Subsequently, the controller 30 performs control so that the output voltage rises to a predetermined voltage of the power grid 300 exceeding the operating voltage (step S204).

The remaining configuration and effects of the power control apparatus 101 according to the second embodiment are similar to those of the power control apparatus 101 according to the first embodiment.

Third Embodiment

[System Configuration]

A power control apparatus 101 according to the third embodiment may have a configuration similar to that of the power control apparatus 101 according to the first embodiment. The differences in the third embodiment are therefore mainly described below with reference to FIG. 1.

The memory 40 of the third embodiment stores a predetermined time t2.

The loads 200 to 203 each consume first phase (for example, U phase) or second phase (for example, W phase) electric power of a single-phase three-wire system. The loads 200 and 201 are described below as consuming first phase electric power, and the load 202, 203 as consuming second phase electric power.

When the controller 30 of the third embodiment detects a power outage in the power grid 300, the controller 30 performs control so that the first phase voltage supplied from the inverter 25 to the switching device 102 rises to a predetermined voltage. After the predetermined time t2 has elapsed from detection of the power outage in the power grid 300, the controller 30 controls the second phase second voltage supplied from the inverter 25 to the switching device 102 to rise to a predetermined voltage.

Figure 7:
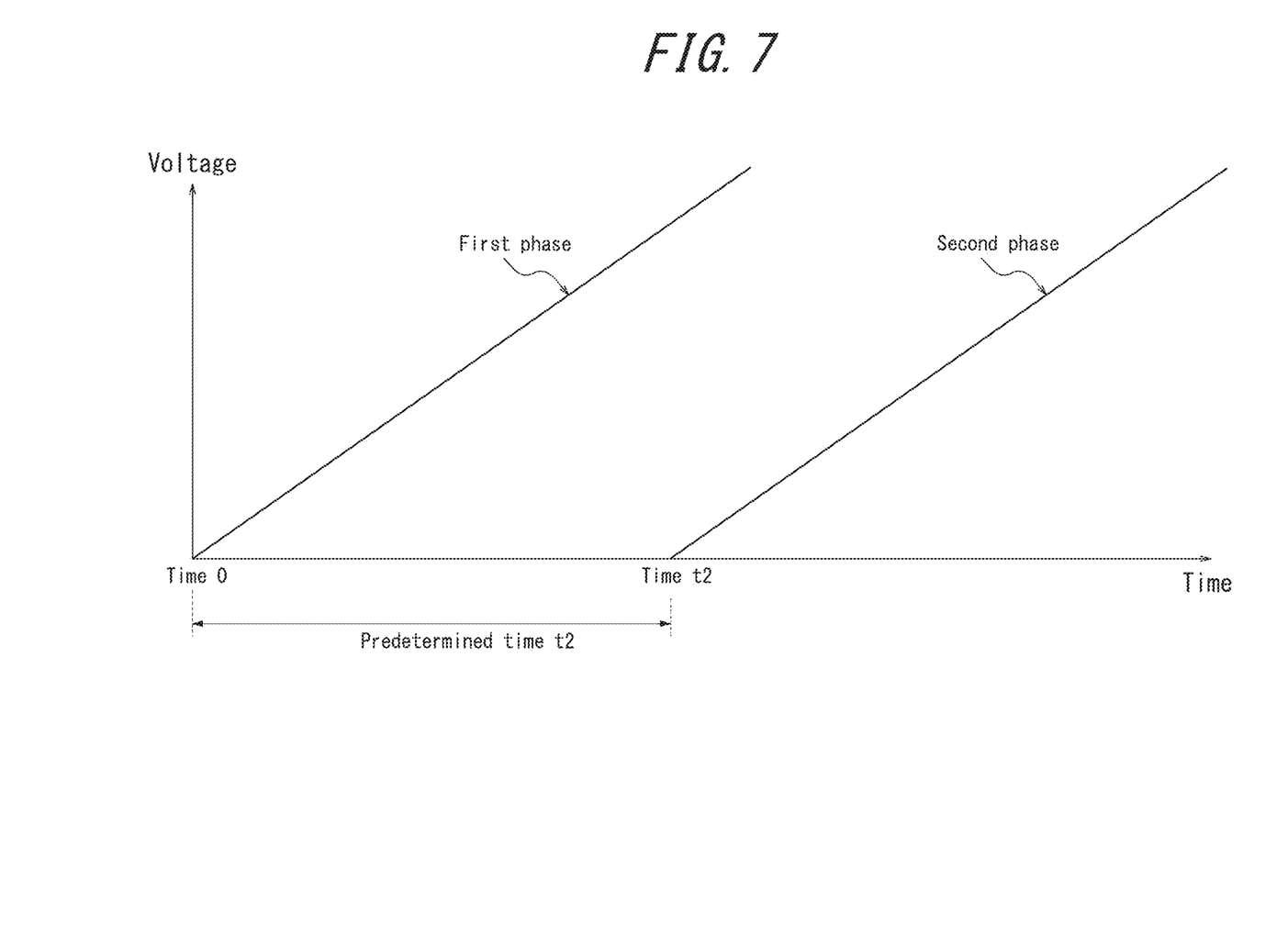
FIG. 7 illustrates the change in the effective value of the output voltage, during a power outage, in a power control apparatus according to a third embodiment of the present disclosure.

FIG. 7 illustrates the change in the effective value of the output voltage, during a power outage, in the power control apparatus 101 according to the third embodiment of the present disclosure. The vertical axis represents the effective value of the output voltage of the inverter 25 (the effective value of the voltage supplied to the switching device 102), and the horizontal axis represents time. In FIG. 7, time 0 is the time at which a power outage occurs in the power grid 300. At time 0, the power outage in the power grid 300 is detected by the controller 30, and the first phase voltage supplied from the inverter 25 to the switching device 102 is controlled by the controller 30 to gradually increase. Furthermore, after the predetermined time t2 has elapsed from detection of the power outage in the power grid 300, i.e. at time t2, the second phase voltage supplied from the inverter 25 to the switching device 102 is controlled by the controller 30 to gradually increase. As a result of this control, the timing at which power starts to be supplied to the loads 200, 201 that consume the first phase electric power is shifted from the timing at which power starts to be supplied to the loads 202, 203 that consume the second phase electric power.

By thus shifting the timing at which to raise the first phase and second phase voltages in the third embodiment, the timing at which power starts to be supplied to the loads 200, 201 that consume first phase electric power and the loads 202, 203 that consume second phase electric power is shifted. Such control allows the power control apparatus 101 according to the third embodiment to reduce the inrush current accompanying the power supply to the loads 200 to 203. Furthermore, when a load that uses the sum of the first phase and second phase voltages is connected, the inrush current accompanying the power supply to the load can similarly be reduced.

The predetermined time t2 can be set taking into account the number of loads 200, 201 that consume the first phase electric power and the number of loads 202, 203 that consume the second phase electric power.

[System Operations]

Figure 8:
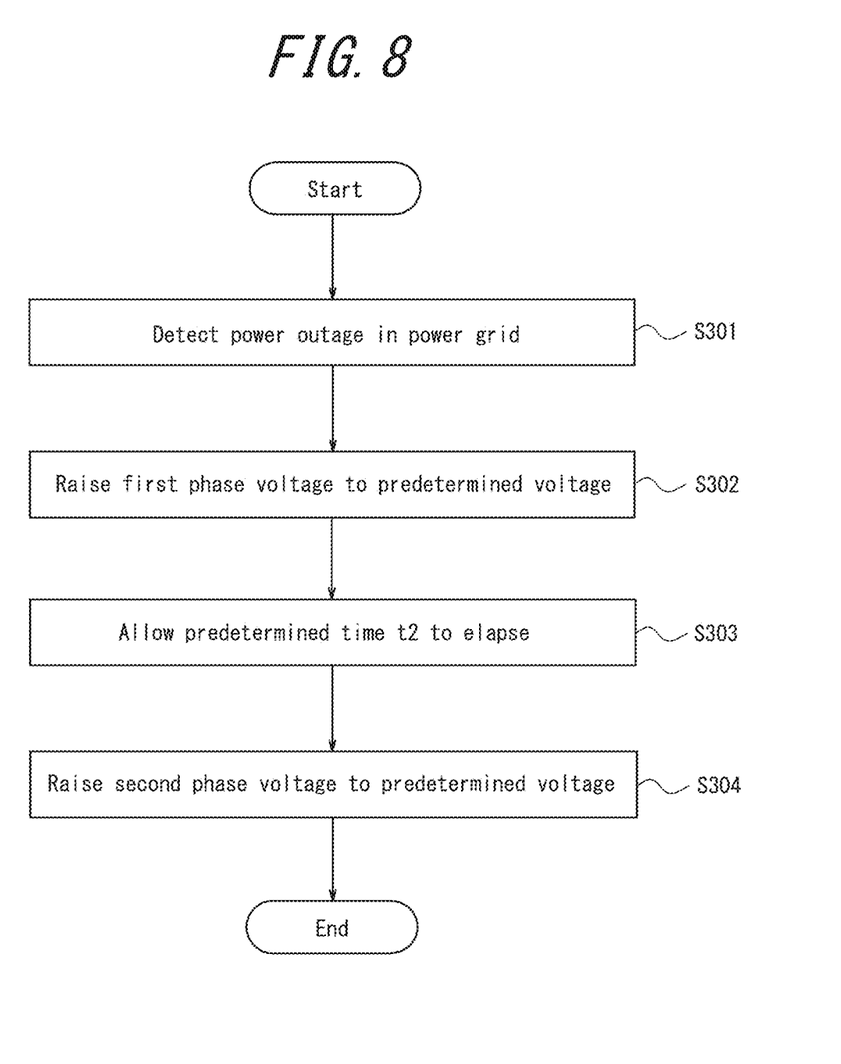
FIG. 8 is a flowchart illustrating an example of operations of a distributed power supply system according to the third embodiment of the present disclosure.

Operations of the power control apparatus 101 according to the third embodiment of the present disclosure are now described. FIG. 8 is a flowchart illustrating an example of operations by the distributed power supply system 1 according to the third embodiment of the present disclosure.

First, the controller 30 detects a power outage in the power grid 300 (step S301). The controller 30 then performs control so that the first phase voltage supplied from the inverter 25 to the switching device 102 rises to a predetermined voltage (step S302). After the predetermined time t2 has elapsed from detection of the power outage in the power grid 300 (step S303), the controller 30 performs control so that the second phase voltage supplied from the inverter 25 to the switching device 102 gradually increases to a predetermined voltage (step S304).

The remaining configuration and operations of the power control apparatus 101 according to the third embodiment are similar to those of the power control apparatus 101 according to the first embodiment.

The control of the present disclosure is described as a series of operations executed by a computer system and other hardware that can execute program instructions. Examples of the computer system and other hardware include a general-purpose computer, a personal computer (PC), a dedicated computer, a workstation, and other programmable data processing apparatuses. It should be noted that in each embodiment, various operations may be executed by a dedicated circuit (for example, individual logical gates interconnected in order to execute a particular function) implemented by program instructions (software). It should also be noted that various operations may be executed by a logical block, program module, or the like executed by one or more processors. The one or more processors that execute a logical block, program module, or the like encompass, for example, one or more of a microprocessor, a central processing unit (CPU), and a digital signal processor (DSP). The one or more processors encompass, for example, an application specific integrated circuit (ASIC). The one or more processors also, for example, encompass a programmable logic device (PLD) and a field programmable gate array (FPGA). The one or more processors also, for example, encompass a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

The network used here may, unless indicated otherwise, be the Internet, an ad hoc network, a local area network (LAN), a cellular network, another network, or a combination of any of these.

The invention claimed is:

1. A power control apparatus comprising:
an inverter configured to convert electric power of a distributed power supply and supply the converted electric power to a switching device; and
a controller configured to:
control an output voltage of the inverter so that voltage supplied from the inverter to the switching device rises to a first voltage when the controller detects a power outage in a power grid, wherein the switching device operating at the first voltage switches from a first electric power supplied to a load from the power grid to a second electric power from the inverter;

maintain the output voltage at or below the first voltage when the output voltage reaches the first voltage; and then to control the output voltage to rise to a predetermined voltage exceeding the first voltage.

2. The power control apparatus of claim 1, wherein the controller is further configured to maintain the output voltage at the first voltage for a predetermined time after the output voltage of the inverter reaches the first voltage.

3. The power control apparatus of claim 1, further comprising:
a memory configured to store the first voltage;
wherein the controller is further configured to lower the output voltage to below the first voltage when the output voltage of the inverter reaches the first voltage and then to raise the output voltage.

4. The power control apparatus of claim 1, wherein
the output voltage of the inverter comprises a first phase voltage and a second phase voltage, and wherein the controller is further configured to:
control the first phase voltage of the inverter to rise to a predetermined voltage when the controller detects a power outage in a power grid, the first phase voltage being supplied to the switching device, the switching device switching from a first electric power supplied to a load from the power grid to a second electric power from the inverter, and
control the second phase voltage of the inverter to rise to a predetermined voltage after a predetermined time elapses from detection of the power outage in the power grid.

5. A control method of a power control apparatus configured to control electric power of a distributed power supply, the power control apparatus comprising an inverter configured to convert electric power of the distributed power supply, the control method comprising:
detecting a power outage in a power grid;
raising an output voltage of the inverter to a first voltage after detecting the power outage in the power grid, wherein a switching device operating at the first voltage switches from a first electric power supplied to a load from the power grid to a second electric power from the inverter; and
maintaining the output voltage of the inverter at or below the first voltage when the output voltage of the inverter reaches the first voltage and then raising the output voltage of the inverter to a predetermined voltage exceeding the first voltage after a predetermined time elapses.

6. A distributed power supply system comprising:
a distributed power supply;
a switching device; and
a power control apparatus, the power control apparatus comprising an inverter configured to convert electric power of the distributed power supply and a controller configured to control the inverter;
wherein the controller is configured to:
control an output voltage of the inverter so that voltage supplied from the inverter to the switching device rises to a first voltage when the controller detects a power outage in a power grid, wherein the switching device operating at the first voltage switches from a first electric power supplied to a load from the power grid to a second electric power from the inverter, and
maintain the output voltage at or below the first voltage when the output voltage reaches the first voltage and then to control the output voltage to rise to a predetermined voltage exceeding the first voltage.

7. The distributed power supply system of claim 6, wherein when the output voltage of the inverter reaches the first voltage, the controller is configured to maintain the output voltage at the first voltage for a predetermined time.

8. The distributed power supply system of claim 6,
wherein the power control apparatus further comprises a memory configured to store the first voltage; and
wherein when the output voltage of the inverter reaches the first voltage, the controller is configured to lower the output voltage to below the first voltage and then to raise the output voltage after a predetermined time elapses.

9. A control method of a distributed power supply system comprising a distributed power supply, a switching device, and a power control apparatus, the control method comprising:
detecting, using the power control apparatus, a power outage in a power grid;
raising, using the power control apparatus, an output voltage of an inverter of the power control apparatus to a first voltage after detecting the power outage in the power grid, wherein the switching device operating at the first voltage switches from a first electric power supplied to a load from the power grid to a second electric power from the inverter; and
maintaining, using the power control apparatus, the output voltage of the inverter at or below the first voltage when the output voltage of the inverter reaches the first voltage and then raising the output voltage of the inverter to a predetermined voltage exceeding the first voltage after a predetermined time elapses.

* * * * *